(12) United States Patent
Nighan, Jr. et al.

(10) Patent No.: US 9,622,333 B2
(45) Date of Patent: Apr. 11, 2017

(54) LINEAR ACCELERATOR SYSTEM WITH STABLE INTERLEAVED AND INTERMITTENT PULSING

(71) Applicant: ETM Electromatic, Inc., Newark, CA (US)

(72) Inventors: William L. Nighan, Jr., Portola Valley, CA (US); Maarten Korringa, Mountain View, CA (US); John Howard Rolin, Morgan Hill, CA (US); Devin Kirk Henderlong, Boulder Creek, CA (US)

(73) Assignee: ETM ELECTROMATIC, INC, Newark, CA (US)

(*) Notice: Subject to any disclaimer, the term of this patent is extended or adjusted under 35 U.S.C. 154(b) by 0 days.

(21) Appl. No.: 14/192,864

(22) Filed: Feb. 27, 2014

(65) Prior Publication Data
US 2015/0245463 A1 Aug. 27, 2015

(51) Int. Cl.
*H05H 7/02* (2006.01)
*H05H 9/04* (2006.01)
*G01V 5/00* (2006.01)

(52) U.S. Cl.
CPC ............ *H05H 7/02* (2013.01); *G01V 5/0016* (2013.01); *H05H 9/048* (2013.01); *H05H 2007/022* (2013.01)

(58) Field of Classification Search
CPC .............. A61N 5/10; A61N 2005/1089; A61N 5/1042; A61N 5/1077; A61N 5/1083; H05H 7/02; H05H 9/02; H05H 7/12; H05H 9/048; H05H 2007/022; H01J 35/16; G01N 23/083; G01N 23/09; G01N 23/10; H05G 2/00
USPC ............................................. 378/65, 57, 106
See application file for complete search history.

(56) References Cited

U.S. PATENT DOCUMENTS

| 2008/0043910 | A1* | 2/2008 | Thomas | 378/65 |
| 2010/0038563 | A1* | 2/2010 | Chen | H05H 7/02 250/503.1 |
| 2011/0188638 | A1* | 8/2011 | Treas | H05H 7/02 378/137 |
| 2012/0294423 | A1* | 11/2012 | Cheung et al. | 378/65 |

* cited by examiner

*Primary Examiner* — Dani Fox
(74) *Attorney, Agent, or Firm* — James E. Eakin

(57) ABSTRACT

A linac-based X-ray system for cargo scanning and imaging applications uses linac design, RF power control, beam current control, and beam current pulse duration control to provide stable sequences of interleaved pulses having different energy levels, for example alternating 4 MeV and 6 MeV pulses or other energies where the difference in levels is at least approximately 1 MeV and less than approximately 5 MeV. The pulse repetition rate can be 100-400 pulses per second or more. In an embodiment, a cool down calculation is combined with automatic frequency control to provide stable energy and dose per pulse even upon restarting of pulsing after an "off" period of indeterminate duration.

15 Claims, 6 Drawing Sheets

LINEAR ACCELERATOR SYSTEM WITH STABLE INTERLEAVED AND INTERMITTENT PULSING

FIELD OF THE INVENTION

The present invention relates generally to X-ray devices, and more particularly relates to linac-based scanning systems and methods having stable interleaved pulses of different energies, and stable intermittent pulsing.

BACKGROUND OF THE INVENTION

Linear accelerator ("linac" hereinafter) X-ray generating systems have been in use in the medical environment for a number of years. More recently, such systems have begun to be used in the industrial environment, particular for cargo scanning. To distinguish the materials inside a cargo container, X-ray pulses of different energies have been used. Energies in the range of 2 MeV to 10 or more MeV have been proposed in the literature, and commercial devices offering energies at approximately 4 MeV and 6 MeV are commercially available. In many instances, both medical and industrial linac X-ray sources are excited by RF sources operating at or near the S-band, roughly 2.998 GHz. In each case, the linac accelerates a stream of electrons in conjunction with RF excitation, and the linac must be designed such that its resonance can be matched by the frequency of the RF source. Once the electrons have been sufficiently accelerated, if X-rays are desired, they strike a target, such as tungsten, resulting in the emission of high energy X-rays that can be used for medical treatment, materials processing, scanning of cargo, and other applications. These mega-electron-volt (MeV) X-ray applications have provided significant benefits in many fields.

The most prevalent medical and industrial linacs are resonant structures, and require an RF excitation source, typically either a pulsed magnetron or a pulsed klystron. To couple the power from an RF excitation source into a linac, for the purpose of accelerating electrons, the frequency of the RF source output must be adequately matched to the resonance frequency of the linac structure. Standing wave linear accelerators are somewhat more sensitive to the accuracy of the excitation frequency than are traveling wave accelerators, yet both are sensitive. In addition, a given linac's optimum excitation frequency is typically sensitive to temperature of the linear accelerator, as is well known. The output frequency of the RF excitation source can also change with environmental conditions such as temperature, and AFC (automatic frequency control) circuits are often used to maintain a good match between the RF source and the linac.

The maximum electron energy, and thus the resulting X-ray energy that can be obtained from a given linac structure is dependent upon the peak power coupled into it from the RF source, and also dependent upon the beam current within the accelerator at the time the RF power is applied, using known relationships. In addition, the Q of the linac can affect the performance of the system. For most linac-based systems, a high Q has been deemed desirable, typically between 5000 and 10,000.

In industrial applications such as cargo scanning, X-ray pulsing permits images of the contents of a container to be created without opening the container. The high energy, MeV level X-rays from linac systems allow adequate penetration through large containers and their typical contents. The image of the contents of a container is typically a composite of a large number of scans, or image "slices" at different energies, in some cases 1000 to 10,000 or more such slices. As an example, a commercial cargo scanning system may pulse a linac at 100 to 400 X-ray pulses per second, as a truck passes through a scanner, and the images from each of those pulses are then composited to create the completed image. In some prior art cargo scanning operations, imaging systems that use linacs can scan between 24 and 150 trucks per hour depending upon the mode.

Different X-ray energies, such as 4 MeV and 6 MeV, are useful in cargo scanning because it permits the materials in the container to be differentiated. By comparing the images taken at 4 MeV with those taken at 6 MeV, steel can be distinguished from uranium, as just one example. Likewise, organic material, aluminum, lead, and so on, can be distinguished.

However, it is impractical to take a first scan of a container resting on the bed of a truck at a first X-ray energy, and then take a second, later scan of that same container at a second X-ray energy. Instead, it is more practical to interleave pulses of the different frequencies, so that a scan of both energy levels is taken in a single pass, for example by means of interleaved pulses of two energies in an ABABABAB pattern. This interleaving, however, can present challenges to a linac system since the performance of a linac with its resonant structure is highly dependent on a good frequency match. Some well known techniques for modifying the input parameters to a typical 6 MeV linac system, in order to obtain a 4 MeV output, involve either reducing RF power to reduce the maximum possible acceleration for electrons in the linac, or increasing the beam current to provide beam loading that ultimately reduces the maximum acceleration that each electron experiences, or a combination of these two effects. These techniques have been sufficient when the time between energy changes is long, such as seconds or many seconds, but have been less effective when the time between energy changes is a fraction of a second. It is also possible to intentionally detune the resonance frequency of the RF source with respect to the linac—this has the effect of lowering the amount of RF power coupled into the linac, reducing the total possible acceleration for electrons. However, detuning can cause instabilities in performance, and is difficult to do in a fraction of a second if a mechanically-tuned magnetron is the RF source. A challenge with applying prior art techniques for changing linac energy on a rapid time scale in an ABABABAB fashion can be the undesired corresponding detuning of the RF source. For example, in addition to intentional tuning, reducing or increasing RF power from a magnetron typically results in a change in frequency of the RF output. If the frequency change is large enough, the linac's resonance is no longer matched to the frequency of the RF excitation pulse, and the system fails to operate. A pulse-to-pulse variation of RF amplitude or variation in RF frequency in a detuned condition will cause a greater change in linac output performance than operation at peak or tuned condition.

While the terms "4 MeV" and "6 MeV" are commonly used in the art, those terms typically refer to the peak energies of the X-ray pulses, and the average energy can be less. These terms will be used herein with that same understanding.

Because of the sensitivity of linac-based systems to changes in frequency, the prior art has generally not been able to provide a fully optimized train of stable, interleaved pulses of different energies such as an ABABABABAB (etc.) pattern, especially where the energy must be changed rapidly, from one pulse to the next, at a 2.5-millisecond basis or shorter such as required for a pulse rate of 400 or more pulses per second, and especially when that rapid change is done with a magnetron driven system.

While magnetrons do not offer some of the advantages of klystrons, magnetrons such as the MG5193, MG6090, and MG7095 from supplier e2V have typically been used as RF sources for medical and cargo scanning applications. Similar magnetrons are available from National Japan Radio Corporation (NJRC). Unlike klystrons, magnetrons are not amplifiers, and the output frequency of a magnetron is adjusted by a mechanical tuner. This limits the ability to rapidly switch a magnetron system between higher and lower energy levels while still maintaining a frequency match with the linac, because the magnetron frequency will shift upon a power change and a mechanical tuner simply cannot be moved rapidly enough to support a 2.5 millisecond or shorter period between pulses. The duty cycle of such devices is typically low, for example approximately 0.1% for the MG5193, MG6090, and MG7095, such that pulse durations of a few microseconds, for example 2.5 microseconds, can be generated at up to 400 pps. For an MG5193, 4.5 turns of the mechanical tuner allow for about nine megahertz of tuning range. One drawback of a magnetron is that its mode and stability can become unfavorable if the magnetron is operated at a peak power too much different from its optimum or maximum peak power. The MG5193 can operate between about 1.5 MW peak and about 2.6 MW peak. The MG6090 and MG7095 can provide higher peak power outputs, such as 3 MW of peak power.

It is possible to change the power output of a magnetron rapidly through the use of a conventional high voltage capacitor-charging power supply together with a pulse forming network/modulator. With such a technique, interleaved high voltage ("HV") pulses can be supplied to the magnetron in an ABABABAB sequence. The result is that the RF power output of the magnetron can be varied rapidly as well, and also in an alternating fashion.

However, as noted before, changing the power output of the magnetron also causes a change to the output frequency of the RF pulse, such that the output frequency of the magnetron can be a mismatch for the linac. For example, the MG5193 and similar magnetrons can have a frequency shift of about 10 kHz per ampere, and they are typically driven at around 100 amps or more. Changing this current by many amperes may cause a significant detuning with respect to the resonance of a given linac. While AFC circuits can compensate for long term changes in frequency, such circuits are not intended to compensate for instantaneous pulse-to-pulse changes such as occur with a magnetron is driven with an alternating sequence that varies by several amps. As a result, such approaches can result in instability of the magnetron-linac system, and there has been a need for a system and technique for maintains stability while permitting the use of interleaved pulses of different RF powers to generate an interleaved pattern of X-ray pulses of different energies.

In addition to the challenges to prior art systems that result from variations in RF matching between the output frequenct of a magnetron and the resonant frequency of the linac, the prior art has also had challenges in maintaining a consistent dose from pulse to pulse when interleaved pulses of different energies are generated. While dose control is known in medical systems, the need for ABABABAB sequences of different energies is not typically found in medical X-ray systems. Dose control in prior systems typically involves either changing the RF peak power coupled into the linac, or through beam loading, which involves changing the peak electron beam current into the linac, or both. For example, it is well known that increasing the peak beam current into an accelerator will reduce the energy of the electrons leaving the linac. The value of the beam current can be controlled by controlling the electron gun, but, if the maximum energy of the electron beam is change, then the dose rate will also change absent taking steps to prevent that change. For example, using beam loading to change the X-ray energy from 6.5 MeV to 5 MeV can change the dose in some systems by a factor of two. However, for the use of X-rays to differentiate among materials, as required for cargo scanning applications, such changes in dose per pulse are undesirable. Instead, it is preferable that both energy and dose be controlled on a pulse-by-pulse basis even where the pulses are at different energies, such as energies that are different by more than 1 MeV.

While dose control in medical applications can be achieved through changes in repetition rate, this is not desirable for cargo scanning applications which depend upon having consistent repetition rates. As a result, there has been a need for a cargo scanning system which offers dose control on a pulse-by-pulse basis while offering stable sequences of interleaved pulses of different energies.

A further problem in cargo scanning applications is the intermittent nature of the operation of such scanning systems. The X-ray emission in a cargo scanning system is typically turned off after each scan is completed. For example, a first truck, carrying a container, can be scanned, and then the scanner is turned off. A next truck carrying a container arrives a few seconds later, or a minute, or some other indeterminate time period. As noted previously, the operating frequency of the linac changes with temperature. It is well known that the linac heats up during scanning, which requires that the output of the magnetron be adjusted to maintain a good match with the linac. While AFC circuits, which typically rely on feedback of the forward and reflected power of the linac, can maintain that good match when the linac system is being pulsed, there is no such feedback when the scanner is off and the linac starts to cool. As a result, typical prior art systems using conventional AFC may leave the tuner of the magnetron in the same position it was in when the scanner was turned off. Depending upon the frequency drift of the linac versus the RF source during the "off" period and the mismatch between RF source frequency and linac resonance, the system may simply not operate when scanning is restarted, or, more commonly, the energy output and/or dose output of the linac system will be less than intended. While this affects only the first few pulses, or 10 pulses or more after scanning is re-initiated, before the AFC circuit can achieve a good match, this lack of consistency in output energy and/or dose can affect the quality of the resulting images, and is therefore undesirable.

One prior art technique involves turning on the RF source to the linac in advance of enabling any beam current from the electron gun of the linac, to perform a partial warm-up of the linac beamline by the RF source prior to the electron beam triggering. In another approach, a typical AFC is used during the RF-only partial warm-up period, with an offset added to the tuning in advance of any expected electron beam triggering.

These warm-up approaches have the significant disadvantage of potentially generating some amount of X-rays even when the electron gun is not being pulsed. Such X-rays can be generated by virtue of the high electric fields in the RF-pulsed linac pulling electrons from the electron gun and cavity walls. Another disadvantage is the consumption of average power that is not used for the generation of X-rays. These approaches are inefficient and therefore undesirable.

As a result, there has been a need for a linac-based X-ray scanning system that provides consistent pulse energies even for the initial pulses of a sequence despite intermittent operation and "off" periods of indeterminate duration.

SUMMARY OF THE INVENTION

The present invention overcomes the aforementioned limitations of the prior art by providing a stable sequence of interleaved pulses of different energies, while at the same time providing consistent and precise pulse-to-pulse dose control.

In one aspect of the present invention, a series of X-ray pulses of at least two different desired energy levels is created by providing an RF power generator, typically a magnetron, which supplies to a particle accelerator such as a linac RF pulses of at least two different controllable powers at two different corresponding rf frequencies. The Q of the linac is designed to be sufficiently low that the different RF frequencies of the pulses from the RF power generator remain within the resonance bandwidth of the linac. At least one gun driver supplies at least two different controllable current pulses to the electron gun of the linac, with the pulses of each different current synchronized to occur within an envelope created by an RF pulse of a corresponding power. The resultant electron pulse from the electron gun of the linac is accelerated until it strikes a target, for example tungsten, to generate an X-ray pulse at one of the desired energy levels. The dose of each pulse is adjusted by altering the duration of the current pulse of from the electron gun, which permits the X-ray pulses of different energy levels to supply the same dose per pulse, or different doses adjusted to a desired ratio.

In a different aspect of the invention, compensation is provided for the changes in performance in both the linac and the RF power generator as the result of thermal and other influences caused by intermittent operation. For example, in a cargo scanning application, the linac system is operated to generate X-rays during the period that a cargo container passes through the scanner. The scanning function is then turned off, for example by disabling power to the RF power generator, until the next container is moved into position for scanning. The scanning function is then restarted. The "off" period is of uncertain duration because it depends upon when the next container is properly positioned. As a result, the performance parameters of both the RF power generator and the linac can vary significantly, to the point that a mismatch between the frequency of the RF generator pulses and the linac resonance can occur which may prevent stable system operation altogether.

To prevent such mismatches resulting from the intermittent operation of the linac system, the present invention provides a system and method for adjusting the frequency of the RF power generator during periods when the scanning function is disabled, such that, when scanning is re-enabled, the frequency of the RF power generator has been adjusted to maintain a substantial match with the changed resonance of the linac resulting at least in part from the cooling of the linac while scanning was disabled. In addition, in some embodiments, ambient temperature is sensed and incorporated into a cool down compensation system and method. In at least some embodiments, the compensation results in the dose of the first pulse after re-enabling being within ten percent of the average dose during the period when scanning is enabled, and, depending upon the embodiment, can be within two percent or one percent of the average dose.

Depending upon the embodiment, the RF power generator can be either a magnetron or a klystron. In those embodiments using a magnetron, the frequency of the magnetron is adjusted by mechanically adjusting the tuner with a stepper motor, with the AFC causing motion of a number of steps from the "home" setting, where the home setting is the optimized setting of the tuner to match the RF output frequency with the resonance of the linac when the linac is operated at a sufficiently low repetition rate that thermal influences do not greatly change its resonance. After a period of operation, the AFC will move the tuner to an optimum position for linac performance. During an "off" period of indeterminate duration, the cool down compensation system and method moves the tuner in the absence of feedback in order to maintain a match between RF source frequency upon restarting pulsing, and that of the linac. In a preferred embodiment, the number of steps of tuner correction may correlate to the duration of the "off" period, and, if the off duration is long enough, the correction eventually causes the tuner to return to the home position. For embodiments using a klystron, the RF output frequency is adjusted electronically.

THE FIGURES

The foregoing summary of the invention, as well as additional aspects and features, will be better understood from the following detailed description, taken in conjunction with the appended Figures, in which.

DETAILED DESCRIPTION OF THE INVENTION

Figure 1:
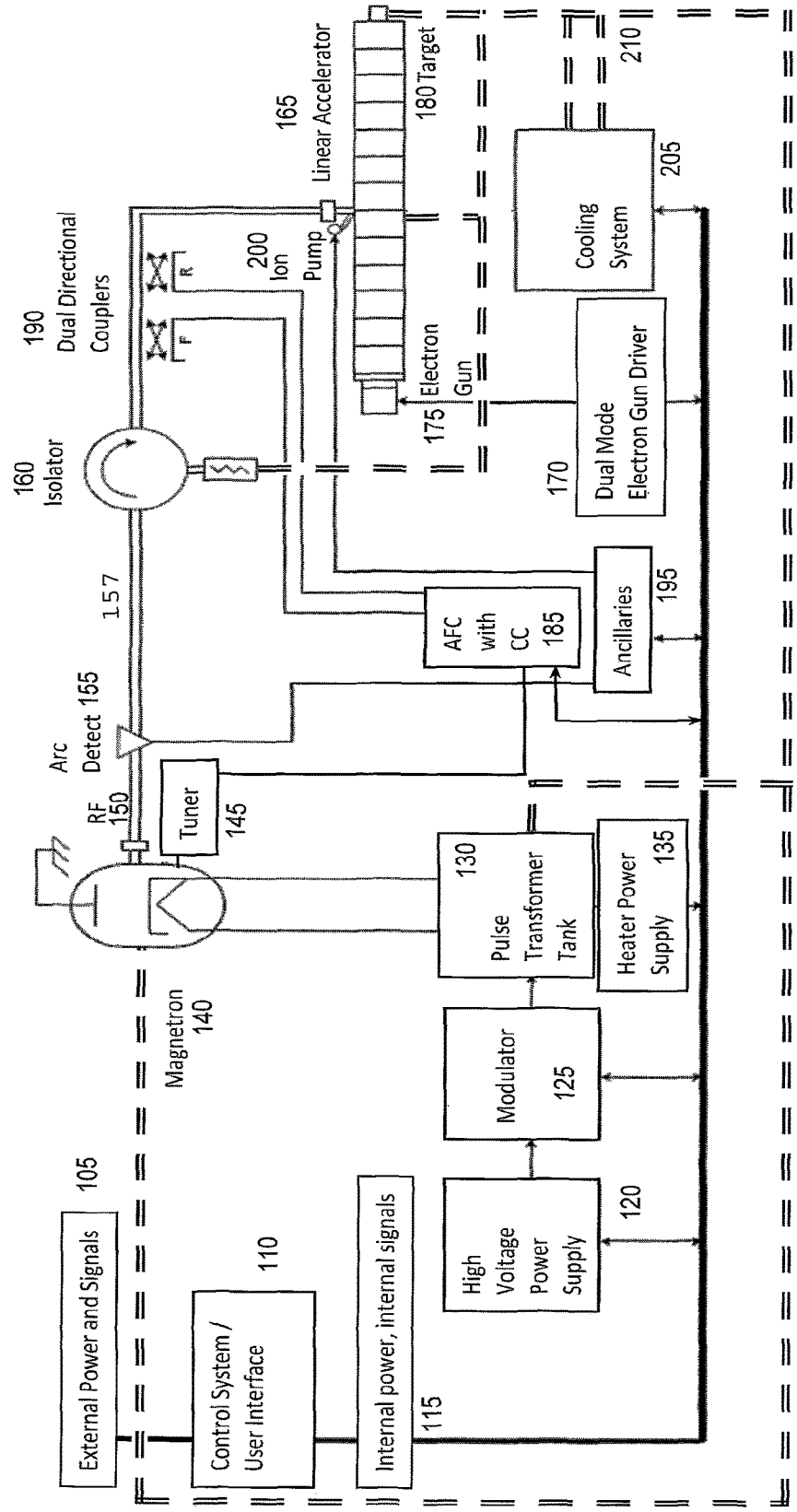
FIG. 1 is a block diagram of a linac-based X-ray system in accordance with an embodiment of the invention.

Referring first to FIG. 1, an X-ray scanning system according to an embodiment of the invention is shown in block diagram form at 100. In such an embodiment, external power and signals 105 are received by a control processor 110. Included among the external signals are, typically, one or more trigger signals indicating that the user desires to scan an object, for example a cargo container on a vehicle passing before the scanning system. The control processor 110 controls, directly or indirectly, the operation of the remaining functional blocks shown in FIG. 1 by virtue of signals sent on internal bus 115, which, for simplicity, is shown combined with internal power.

In response to the trigger signal(s), the control processor 110 sends, depending upon the implementation, a plurality of signals to initiate generation of an X-ray pulse. In particular, the processor 105 sends control signals to a high voltage power supply 120 and an associated modulator 125 which receives the output from the supply 120. The supply 120 can be, for example, a Lambda LC1202. The output of the modulator 125 supplies a high voltage output to a pulse transformer 130, typically immersed in an insulating tank for purposes of electrical isolation. An aspect of the modulator is that can vary the voltages from one pulse to the next, and can operate at pulse durations of 2.5 psec or less, to permit operation at 400 pulses per second. The modulator may incorporate a pulse-forming network or PFN. A heater power supply 135 is associated with the tank and supplies the magnetron 140 or other suitable RF power source. The pulse transformer 130 supplies high energy pulses, for example 30-50 kV at 100-110 amps, to a magnetron 140 or other suitable RF power source. One suitable magnetron is the e2V model MG5193, which has an output of 2.6 MW at the normal S band frequency of 2.998 GHz. Another is the MG7095, also from e2V. Still other similar magnetrons are available from NJRC. The specific magnetron frequency is controlled by a mechanical tuner 145.

The magnetron 140 outputs an RF power pulse, indicated at 150, at the frequency determined by the tuner 145. As explained in greater detail below, the pulses received by the magnetron can be of different, pre-selected voltage and currents, thus causing the magnetron to output pulses of different, pre-selected RF powers, for example, pulses of 40 kV and 45 kV at 100 amps and 110 amps, respectively. Because of the nature of the magnetron, the different powers of the RF pulses also affect the frequency of the output pulse, again as explained in greater detail below. The RF power pulses pass through an arc detector 155, an isolator 160, and then to a linear particle accelerator (sometimes "linac" hereinafter) 165. Suitable isolators are available from Ferrite Incorporated. Conventional S-band waveguide 157 is used between magnetron and linac. Depending upon the requirements of the particular linac, for example of the type shown in FIG. 2, the pulses received from the transformer 130 can be in the range of, for example, 35-50 kV. The linac 165, which typically has an effective Q in the range of 2000-4000, but in any event less than 5000, receives the RF pulse. The tuner 145 is adjusted so that the RF pulses from magnetron 140 are within the resonance bandwidth of the linac 150. The pulses from the magnetron are, in an embodiment, substantially in the range of 2.5 MW, or between 2.0 MW and 3.0 MW.

In the embodiment of FIG. 1, the control processor 110 sends a control pulse to the modulator 125, and it sends a synchronized control pulse to a dual mode electron gun driver block 170. The timing of these control pulses may be individually optimized. The dual mode electron gun driver block 170, explained in greater detail hereinafter in connection with FIG. 5, drives an electron gun 175, the cathode of which is within the vacuum envelope of the linac 165. The gun 175 can be a triode gun design. In an embodiment, the pulses of beam current from electron gun 175 launch electrons into the cavities of the linac. The cathode voltage is substantially in the range of −10 to −20 kV. In an embodiment it is −20 kV. By timing the electron pulses at the linac to optimally synchronize with the electric field created by the RF pulses from the magnetron, as discussed in greater detail hereinafter, the electrons are accelerated by the linac to a desired energy level, typically in the range of two to ten or more MeV with, for at least some embodiments, a separation between the energy levels of approximately 1 MeV or more between sequential pulses in a rapidly pulsed ABABABAB pattern. The pulses are directed toward a target 180, for example tungsten, which, when hit with the pulse of accelerated electrons, emits pulses of X-rays. As discussed below in connection with FIGS. 3 and 4A-4E, the RF pulses are, in an embodiment, somewhat longer in duration than the electron gun pulses, such that the RF pulses can be thought of as creating an envelope within which the beam current pulses occur. To control dose, the duration of the beam current is selected by the control system 105, or can be pre-set during manufacture.

Because the transmission characteristics of the linac and magnetron vary with temperature and other environmental factors, an AFC circuit 185 detects forward and reflected power from the linac, using dual directional couplers 190, and in turn controls the tuner 145 to ensure a continuing match between the linac and the magnetron, in a manner known to those skilled in the art.

In another aspect of the invention, in some embodiments, the AFC circuit 185 also includes cool-down compensation, discussed in greater detail hereinafter in connection with FIG. 6. Because X-ray scanning systems operate intermittently, and the duration of the "off" periods is essentially unpredictable, the cool down compensation of the present invention operates the tuner during periods when the scanner is off to maintain a good match between the linac's resonance bandwidth and the output frequency of the magnetron, thus providing improved operational stability.

In addition, ancillaries 195 connect to the arc detector 155 and an ion pump 200 that feeds the linac 165, both in a manner known to those skilled in the art. Finally, a cooling system 205 cools portions of the system in a manner known in the art, for example, the modulator, the pulse transformer tank, the linac, the target, and the isolator, as indicated by the dashed line 210. Suitable cooling systems are available from OptiTemp, and can be chosen dependent upon temperature and cooling requirements of the linac system.

Figure 2:
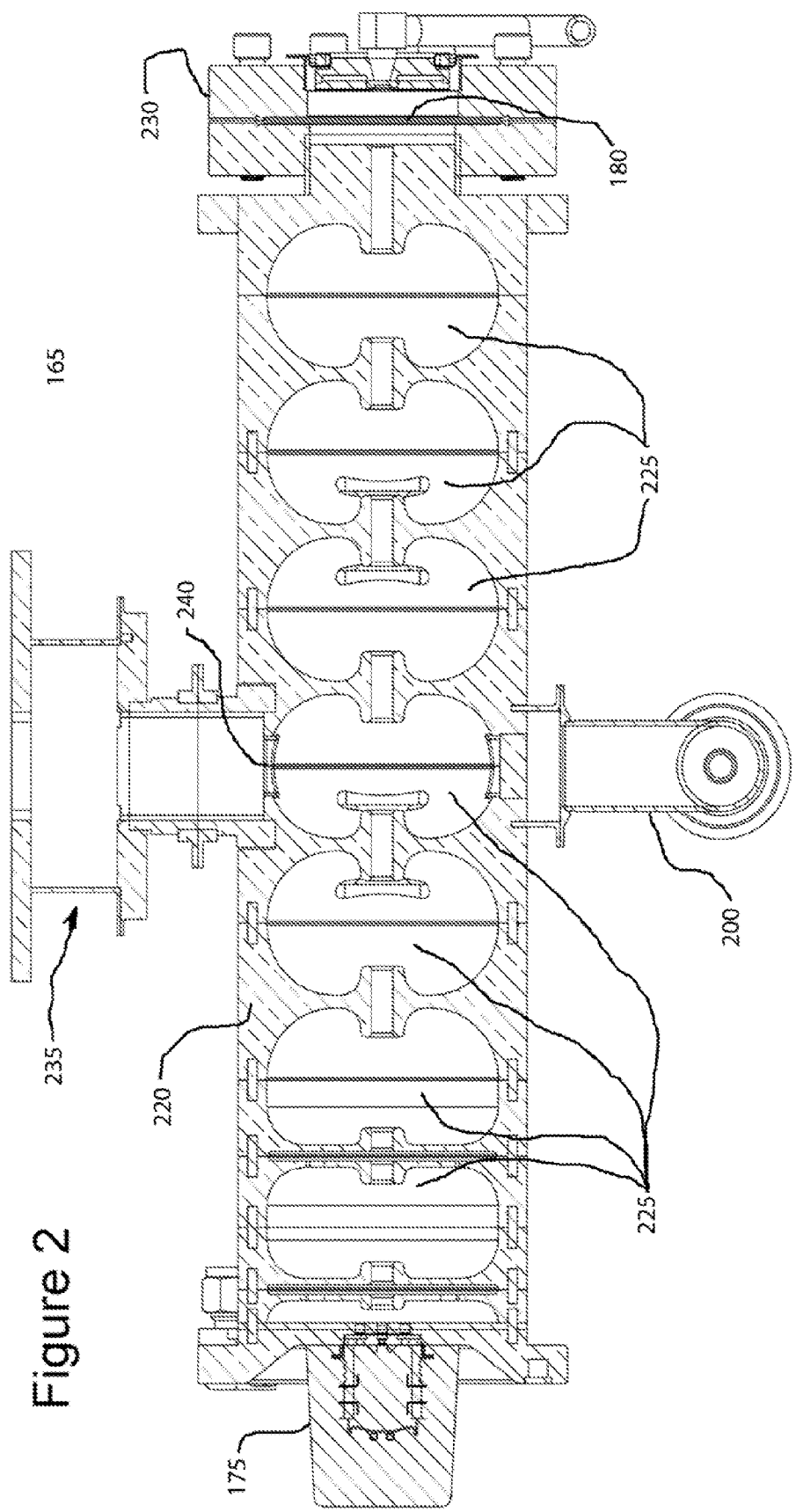
FIG. 2 illustrates in cross-section a linac in accordance with an embodiment of the invention.

With reference to FIG. 2, a linac 165 in accordance with an embodiment of the invention can be better understood. The linac 165 is configured to provide X-ray pulses of different and controllable energies and doses in an alternating fashion. The linac comprises an electron gun 175, which can comprise a gridded electron gun. The beamline 220 is comprised of the main cylindrical section, and is comprised of cavities 225 that have been designed in order to accelerate electrons from the cathode of the electron gun up to speeds that correspond to energies in the MeV range. The cavities of the beamline can be inline coupled or side-coupled, and the cavities are also designed for resonance with the RF source, such as the magnetron 140 in FIG. 1. A water-cooled target assembly 230 is attached to the linac beamline, and houses a target 180, which is made substantially of tungsten, or other suitable material. In an embodiment, the linac is designed to accelerate electrons up to 6 MeV in energy and can also accelerate electrons to 4 MeV in energy on an alternating pulse, interleaved basis, for the purpose of generating X-rays with similar maximum energies per pulse. An ion pump 200 is connected to the vacuum envelope of the linac in a conventional manner. An RF window 235 is attached to the linac beamline, for the purpose of input coupling of RF power. Between the RF window 235 and the beamline 220 is a coupling iris 240 or opening, the size of which can be adjusted in order to assist in tuning the effective Q of the linac assembly.

As discussed above, one aspect of at least some embodiments of the present invention is to generate interleaved sequences of X-ray pulses of at least two differing energies, for example 6 MeV and 4 MeV. In an embodiment, and with reference to FIGS. 3 and 4, the interleaved sequence of pulses rapidly alternates between the higher energy and the lower energy pulses, e.g., ABABABABAB, although other embodiments can provide different sequences of interleaved pulses, such as AABB or any other desired sequence. For purposes of clarity only, the alternating, or ABABABAB, sequence will be described in greater detail hereinafter, as those skilled in the art will understand how to provide other sequences, given the teachings herein. It will also be appreciated that more than two energy levels of X-ray pulses can be generated with the current invention as long as the frequency shifts of the magnetron pulses remain within resonance bandwidth of the linac and are properly matched to the beam current. For purposes of illustration, use of the present invention to generate an AB sequence is explained below, with reference to FIG. 1 and the timing diagrams of FIG. 3.

Figure 3:
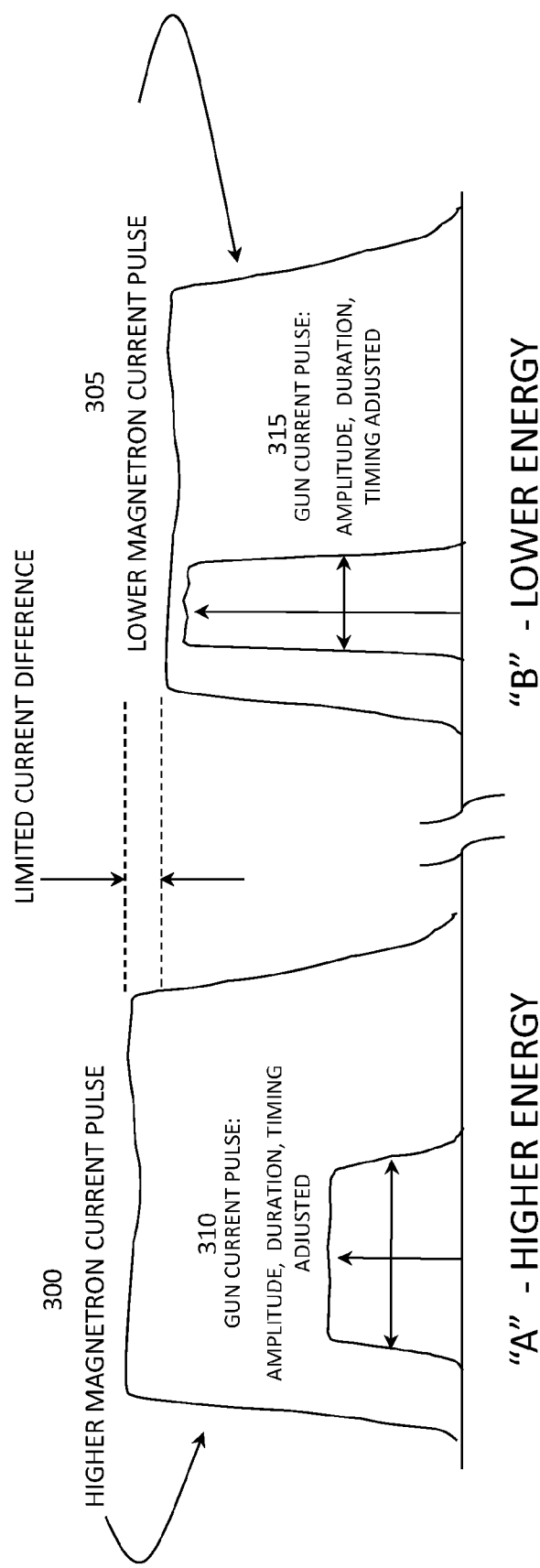
FIG. 3 illustrates the relationship between RF pulses and electron beam pulses in accordance with an embodiment of the invention, including the use of beam pulse duration to achieve pulse-to-pulse dose control.

To generate an alternating sequence of lower and higher energy X-ray pulses, the control system 110 instructs the modulator 125 to supply a different level of power, to the pulse transformer 120 for each different energy level of pulse. This, in turn, varies the power supplied to the magnetron 140, such that the alternating higher and lower RF pulses are supplied by the magnetron to the linac, as shown in FIG. 3 at 300 and 305. By varying the power to the magnetron, the frequency of the output of the magnetron changes, for example by approximately 10 kHz per amp, or 100 kHz when the current supplied to the magnetron varies from 110 amps for 6 MeV to 100 amps for 4 MeV, as an example. As discussed above, the Q of the linac is configured to provide a resonance bandwidth of sufficiently more than 100 KHz, so that both the higher and lower frequencies output by the magnetron remain within the operating range. Again as discussed above, in an embodiment, the Q of the linac is preferably in the range of 2000-4000, and a Q of 3000 has been demonstrated to operate well. In any event, the Q is less than 5000.

As shown in FIG. 3, within the pulse duration of the magnetron pulses 300 and 305, the electron gun driver also generates current pulses of different energies, as shown at 310 and 315. The A pulse is of a desired electron and X-ray energy and X-ray dose, and the B pulse is of a different electron and X-ray energy and X-ray dose that is at least 1 or 1.5 MeV different from the energy associated with the A pulse. The magnetron current pulses are delivered by the pulse forming network and modulator of a preferred embodiment of the invention, and have a duration that is set by the design of the pulse forming network within the modulator 125 shown in FIG. 1. Other modulators could be used where the magnetron current pulse duration can be changed. In an embodiment, the duration of the current pulse is between 2 and 2.5 microseconds for both A and B pulses, and the repetition rate of the pulses is on the order of 100 to 400 pulses per second, or whatever is allowed by the maximum average power dissipation and delivery that a given magnetron can tolerate. For a faster magnetron, a rate of 1,000 pps, and, at the other end of the range, a rate of 1 pps can also have utility in some applications.

The higher current magnetron pulse is typically correlated to the higher energy X-ray pulse, and the lower magnetron current pulse is typically correlated to the lower energy X-ray pulse. The high and low currents cause a higher and lower RF peak power to be delivered to the linear accelerator. The difference between these currents is limited in order to limit the magnetron frequency shift that occurs as a result of different voltage and current applied to the magnetron, in order that both the A and B magnetron frequencies are both well matched to the resonance bandwidth of the linac while still obtaining at least 1 MeV of difference between the X-ray energy of the A pulse and that of the B pulse, when pulsing in an interleaved sequence.

As discussed in connection with FIG. 5, below, the gun driver can be controlled from the control system to alter amplitude, duration and timing of the beam current pulses. The gun current magnitudes are controlled by the gun driver, so that different beam currents for the A pulse and the B pulse are controlled. The combination of different RF power and different beam currents allows control of the energy of the A and the B pulses, in accordance with the method of the present invention. In an embodiment, the energy difference between the A and B pulses is 2 MeV, although in other embodiments the difference can range from 1 to 5 MeV. Further, the gun current pulse durations of the A pulses and the B pulses are independently controlled by the gun driver in order to control the X-ray dose on a pulse-to-pulse basis. The duration of the voltage pulse to the grid substantially controls the duration of the gun current pulse, and therefore the duration of the X-ray pulse. If all other parameters are fixed, and only the pulse duration parameter is adjusted, then the dose per pulse will be adjusted while the X-ray energy for a given pulse will remain the same. In an embodiment, the dose of the A pulse and the dose of the B pulse are substantially equal. In another embodiment, the ratio of the A dose and the B dose is adjusted to a desired ratio other than one.

In addition to the adjustment of gun current pulse duration to control the dose per pulse, the timing of the start of the gun current pulse with respect to the RF pulse can also be adjusted. In a preferred embodiment, the leading edge of the gun current pulse begins early in the "flat" part of the RF waveform. In other embodiments, the leading edge of the gun current pulse can be started later with respect to the "flat" part of the RF waveform.

Figures 4A, 4B, 4C, 4D, 4E:
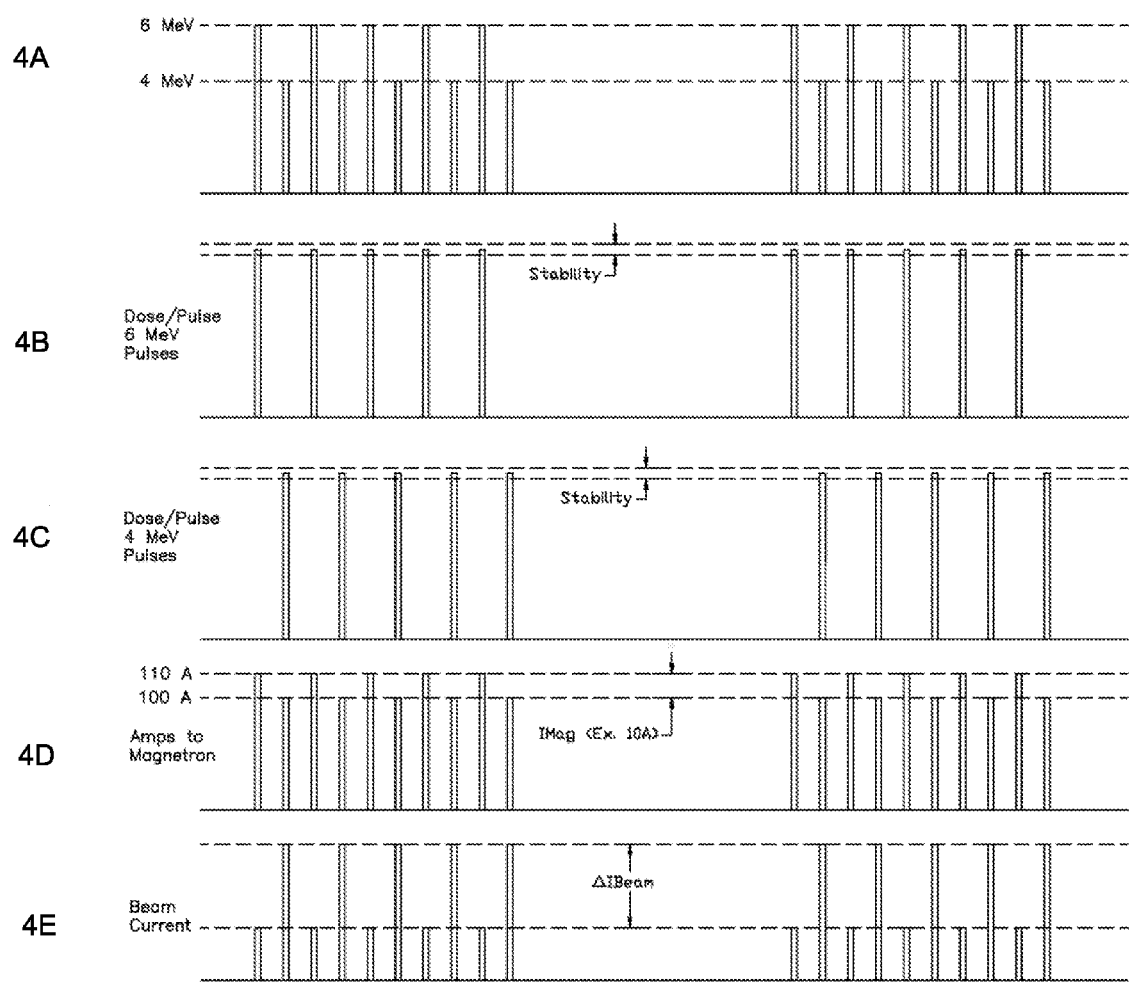
FIGS. 4A-4E are timing diagrams showing an interleaved sequence of stable pulses in accordance with an embodiment of the invention, including dose control.

The overall AB sequence can be appreciated from FIGS. 4A-4E, in which FIG. 4A illustrates two sequences of X-ray pulses with an "off" period of indeterminate duration in between. FIG. 4B illustrates the dose per X-ray pulse for the higher energy X-ray output, while FIG. 4C illustrates dose per pulse for the lower energy X-ray output. Both FIGS. 4B and 4C illustrate a range of dosage amounts with a variance which represents acceptable stability, typically about 10 percent or less, or 2% or less, or 1% or less. FIG. 4D illustrates the current supplied to the magnetron for each of the lower and higher energy pulses, while FIG. 4E illustrates the beam current supplied to the linac for the higher and lower energy pulses. It will be appreciated that the beam current is lower for the higher energy pulses than for the lower energy pulses in an embodiment. In one embodiment of the invention, the peak beam current is controlled to between approximately 25 mA and 125 mA when high energy pulses are desired, and the peak beam current is controlled to between approximately 125 mA and 250 mA as associated with the low energy pulses. Other beam currents are selectable with the linac system of the invention. In an embodiment, the beam currents can be precisely tuned in conjunction with the RF power in order to precisely provide a desired X-ray energy, and thus the X-ray energy can be alternated on a rapid pulse to pulse basis in an ABABABAB interleaved manner.

As discussed above, the pulses generated by the electron gun driver are adjustable in amplitude, duration and timing, which permits the beam current pulses to be synchronized and matched with the RF pulses to generate X-ray pulses of different, controllable energy levels, with consistent, controllable dose per pulse. FIG. 5 illustrates an embodiment of a dual mode gun driver suitable for generating pulses of 2.5 microseconds or less, suitable for cargo scanning functions which typically operate from 100 to 400 pulses per second, in accordance with an embodiment of the invention. Higher repetition rates are possible if standard electrical and thermal parameters are considered, as will be appreciated by those of skill in the art.

Figure 5:
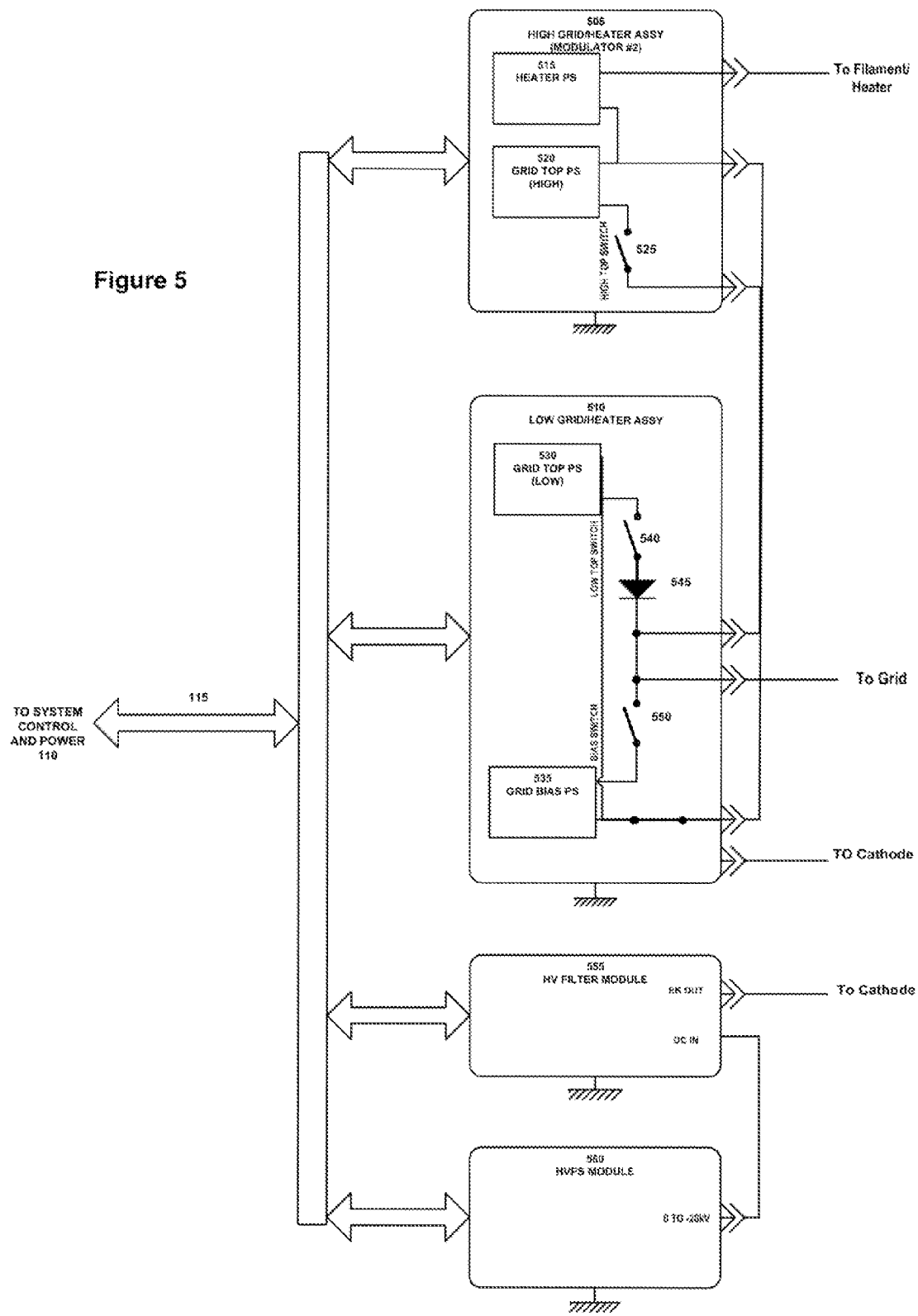
FIG. 5 is a block diagram of a dual mode gun driver in accordance with the invention.

The gun driver 500 shown in FIG. 5 essentially comprises two independently controllable driver modules, one for the high energy pulses, indicated at 505, and another for low energy pulses shown at 510, where each module connects to the grid of the gun 175 (FIG. 1) at the appropriate times through control of high voltage switching transistors, and supplies the appropriate pulse at appropriate but different times as shown in FIG. 4E. The high energy module 505 comprises a heater supply 515 and high energy grid top power supply 520, with the output of the grid top supply 520 connected to the grid output through a switching transistor indicated at 525. The low energy module 510 comprises a low energy grid top power supply 530 and a grid bias supply 535, and the low energy grid top power supply connects to the grid via a switching transistor 540 and a diode 545, while the grid bias supply connects to the grid through a switching transistor 550. The gun driver also comprises a high voltage filter module 555 and a high voltage power supply 560 in a conventional manner.

The performance of the gun driver modules, including the high voltage switching transistors, is controlled from the control system 110 and bus 115, as more generally shown in FIG. 1. Feedback signals from each module are also used, as is common in the art of electronics. The grid modulating modules 505 and 510 are referenced to the cathode voltage, as shown, and apply voltage to the grid of a triode gun that is part of the linac, shown at 175 in FIG. 1. As is known in the art, the control of grid voltage is a common method for controlling the gun current emitted from the cathode of a triode or gridded electron gun. In the preferred embodiment, one grid modulator is used to control the grid voltage associated with the A pulse, and the other grid modulator is used to control the grid voltage associated with the B pulse. In another embodiment, a single grid modulator can be used if the grid voltage can be changed accurately to desired values on a pulse-to-pulse time basis. The grid voltages are controlled in order to control the gun current that is launched into the linac, as the magnitude of the beam current in the linac is a function of the gun current. The independent control of the amplitude of the beam current, combined with the independent control of the RF power, is used to control the X-ray energy on a pulse to pulse basis.

The duration of the grid pulse is used to control the dose of a given X-ray pulse. As discussed above, a shorter pulse yields a lower dose per pulse, whereas a longer pulse corresponds to a larger dose per pulse.

Referring next to FIGS. 6A-6D, a different aspect of the present invention can be appreciated, by which pulses of consistent energy are provided even with a "cold start" or after the linac system in the scanner has been off for an indefinite period. More specifically, FIGS. 6A-6D depict both the effect of classic AFC techniques as well as the novel cool down compensation technique of the present invention that provides stability from the first pulse in an intermittent pulsing application. Since the invention outlined above uses standard prior art AFC techniques, the interleaved ABABA-BABAB etc. output can be stable over long time periods, for example, seconds, and minutes. Longer durations are possible as well. Prior art AFC techniques require at least one feedback signal proportional to the reflected RF power from the linac to insure proper mechanical tuning of the magnetron, as in the case of a preferred embodiment, and as is well known. In the case of a klystron, tuning is accomplished via an input RF driver, but the AFC still requires feedback representative of the output of the RF source with respect to the linac resonance. Since feedback techniques are used, many RF pulses (and therefore X-ray pulses in most systems) are required before the AFC subsystem has sampled enough information and adjusted the magnetron mechanical sufficiently that optimal and stable X-ray pulses are generated. A conventional AFC system alone is not sufficient to allow highly stable operation from the first X-ray pulse after an "off" period without RF feedback. In an embodiment of the invention, in order to take the same linac system with AFC and provide optimal and stable pulsing from t=0, or what is sometimes called a cold start, a cool down compensation ("CC") algorithm has been invented and is used.

With classic AFC circuits, the AFC compensates for thermal effects or long term drift effects that cause a drift in the X-ray pulse performance. If a drift or deviation in performance takes place over many pulses, and if it is due to a correctable frequency mismatch between the RF source and the linac resonance, then the classic feedback techniques used in prior art AFC subsystems can be used to stabilize the system. However, AFC designs and methods typically require many pulses to correct the position of the magnetron tuner and so, if only the AFC is used and if the pulsing is intermittent, that is, shut off for an irregular period of time and then turned back on, the dose and/or energy per X-ray pulse for some number of initial pulses can deviate significantly from the intended dose or energy per pulse.

Figures 6A, 6B, 6C, 6D:
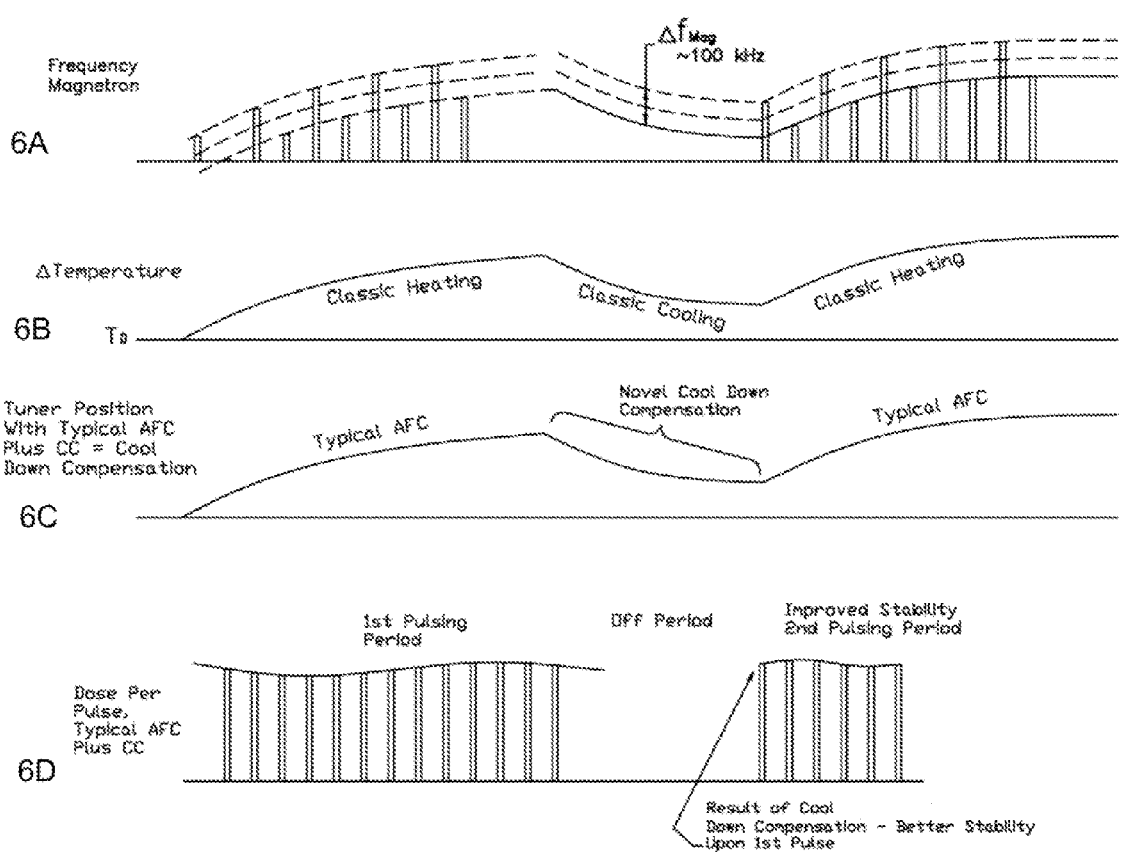
FIGS. 6A-6D are timing diagrams illustrating the cool down cycle which results from intermittent scanning operation, and the improvement resulting from the cool down compensation system and method of the present invention.

FIG. 6A depicts the operation of the magnetron in the context of a classic heating and cooling curve as shown in FIG. 6B. The shape of that curve is generally associated with the deposition of heat during pulsing, and then the dissipation of heat once pulsing stops. This is a classic phenomenon known to those of skill in the art, and when heating is occurring due to pulsing, a classic AFC can help maintain frequency match between a magnetron and a linac. However, when pulsing is turned off, then the system will cool, but the AFC cannot adjust the tuner in the same manner because it receives no feedback signals. The conventional feedback signals like forward RF power and reflected RF power do not exist for the AFC during "off" or non-pulsing periods. When a feedback signal is removed, prior art AFC subsystems have no input information with which to drive a motor or tuner, and may maintain the motor and tuner position that was appropriate for the most recent pulse, or some other position, but that is not appropriate for the next pulse at some indeterminate future point in time. This can result in non-optimum X-ray output or output at unintended values once the system is restarted, because the characteristics of the linac have changed during the off period.

In an embodiment of the invention, cool down compensation logic is provided in the AFC circuit (185 in FIG. 1) that causes the position of the tuner to be changed during non-pulsing periods without the need for feedback, so that the output frequency of the magnetron remains properly matched to the linac resonance characteristics despite the cooling that occurs during an "off" period. In an embodiment, this technique can achieve stabilities significantly better than 10%, and in some instances approximately 1%. The cool down compensation logic can be a look up table (LUT), an algorithm, or other implementation, and is addressed by the AFC circuit when no pulses are detected for a predetermined period of time, for example, one second.

FIG. 6C is a timing diagram that shows the movement of the tuner during cooling periods shows the changing tuner position that follows, and compensates for, the cooling that occurs when scanning is not active. FIG. 6D is a plot of dose per pulse, and illustrates that, as the result of the cool down compensation, the first pulses after a restart are substantially identical in energy and dose as the pulses that occurred during prolonged scanning with the AFC circuit active. In an embodiment, the AFC circuit with cool down compensation logic drives a stepper motor, and the stepper motor moves the tuner on the magnetron in a conventional manner.

The cool down compensation data used to populate a LUT or define an algorithm, as discussed above, can be developed as follows. For a given RF value, a proper magnetron starting or "home" tuner position is determined by very low repetition rate operation of the linac system, at the desired energy and dose per pulse. For example, this home tuner position can be determined at 1 to 10 Hz operation, and can be set by an operator who optimizes system performance vs tuner position, either manually or with a classic AFC. The very low repetition rate simulates a scenario where very little heating is occurring. This home tuner position is recorded in system memory. This type of operation simulates the behavior of a linac system with very little stored heat in either the linac or magnetron. In a preferred embodiment, the magnetron tuner is driven by a stepper motor, and the number of steps away from a motor reference point or mechanical stop is used as a proxy for tuner position. As an example, the home position may be determined to correspond to 50 steps away from the reference point or mechanical stop. A tuner position associated with full power and full repetition rate operation may achieved by 100 or 150 steps away from the reference point or mechanical stop, as an example.

For the CC technique of the present invention to cause optimal tuning during non-pulsing, a calculation or look-up table is generated with motor positions that correspond to substantial matching between magnetron frequency and linac frequency during the time intervals where no pulsing is commanded. After very long off periods, like minutes, the proper motor position corresponds very nearly to the "home" position. After long "on" periods, for example after minutes of operation, the motor position determined by a classic AFC will be many steps away from the home position, in order to tune the magnetron to the linac resonance in a warmed state. For "off" periods of varying durations, the optimal motor position will be somewhere between these two positions, and must be determined.

A variety of techniques can be used to determine optimal motor and tuner position in the absence of pulsing. For an embodiment of the system, an outline of one procedure that can be used to develop the tuner positions during cool down, and thus the entries for a LUT or other correction technique, is as follows:

1. The system is operated at full energy and power, so for example, the magnetron output is 2.6 MW, and it is pulsed at 400 pps with pulse durations of about 2 microseconds for the flat-top of the RF pulse. This mode corresponds to the maximum heat deposition to the system in an embodiment. A standard AFC circuit maintains the match between the magnetron frequency and the linac resonance during this pulsing period, with a time constant on the order of 0.5 seconds. Near steady state can be achieved in times on the order of a few minutes for this approach.

2. The system is turned down to 10 pps abruptly, and the AFC is allowed to tune the magnetron tuner in a standard way, typically by driving a stepper motor. Every 5 seconds, an operator or a data acquisition system records the position of the stepper motor, over a period of several minutes.

3. A plot of stepper motor position is created, which shows steps on the Y axis, and time on the horizontal axis.

4. The plot in step 3 above can be fit to an exponential decay with a time constant, or it can be used to create a look-up table. The calculated exponential decay can be used to calculate the proper tuner position as a function of its most recent position; in a preferred embodiment, the farther a tuner has been stepped from its zero heat or "home" position, the larger its correction per unit time towards the zero heat or "home" position should be.

In an embodiment, a rate of change in terms of steps per second towards home may be calculated or measured from the data collected in steps 1 to 3 above. The rate of change can be plotted as a function of the steps away from home. In a preferred embodiment, the optimal rate of change is largest for position changes that are large with respect to the home position. With the CC active, for any position of the motor that drives the magnetron tuner, there is an associated rate-of-change in steps/second corresponding to that position. This rate of change can either be calculated by determining how many steps the AFC moved between intervals in the procedure 1 to 3, or it can be derived from a fit to the exponential curve to the position vs time data collected in steps 1 to 3. Alternatively, a look-up table can be created.

In an embodiment, an optimal expression of the steps per second as a function of steps from home can take the form $$Y=a*e^{(b*x)}$$

where Y is the optimal steps per second, x is the steps from home, and a and b are constants determined by a mathematical fit to experimental data for the linac system in an embodiment. In general, a is a coefficient representing the magnitude of the exponential equation, and b is a coefficient for curve-fitting. For example, in an embodiment where the stepper motor has on the order of 100 steps of range, a can be 0.13, while b can be 0.034. Those skilled in the art will recognize that these coefficients can be different numbers depending on the thermal behavior of the system, or the behavior of the system in response to other parameters. When the CC is used to move the stepper motor that moves the magnetron tuner, and the CC uses the formula, the pulsing performance in an intermittent pulsing scenario was very nearly optimal for every pulse, as shown in FIGS. 6D and 6E.

In an alternative embodiment, the following procedure can be used:

1. Warm up at 400 pps for 3 minutes, note warmed-up tuner motor step position with respect to home (position as controlled by classic AFC).

2. Shut off for 5 seconds, turn back on, record tuner motor step position after 2 seconds (position as controlled by classic AFC).

3. Warm up again at 400 pps to same warmed-up tuner motor step position as #1.

4. Shut off for 10 seconds, turn back on, record tuner motor step position after 2 seconds (position as controlled by classic AFC).

5. Warm up again at 400 pps to same warmed-up tuner motor step position as #1.

6. Shut off for 15 seconds, turn back on, record tuner motor step position after 2 seconds (position as controlled by classic AFC).

Continue this sequence for up to 2 minutes of shut off time. Plot the data as tuner motor position in "steps-from-home" (y axis) vs "cool-down time" (x axis).

7. Fit an exponential to that data.

8. Take the derivative of that data, and plot it on the same graph, which will now depict both the exponential fits to "steps-from-home" and "steps/second" vs "cool-down time".

9. Create a new plot of "steps/second" vs the "steps-from-home".

In an embodiment, this table created from such techniques is used by the AFC with CC during customer-triggered intermittent operation to provide the rate at which the tuner motor should be moved any time the RF is turned off, based upon the last position where the tuner motor was left by the AFC. In this embodiment, the AFC controls the tuner motor position while RF and X-rays are pulsing, and the CC controls the tuner motor position when RF and X-rays are turned off.

From the foregoing, those skilled in the art will recognize that a new and novel linac-based X-ray scanning system has been disclosed, offering significant improvement in pulse-to-pulse stability for interleaved pulses of different X-ray energies, including pulse-to-pulse dose control, all on a rapidly pulsed basis. In addition, in another aspect of the invention, cool down compensation permits substantially improved stability in the dose and energy of the initial pulses after a cold start, or after a restart after an off period of indeterminate duration. Given the teachings herein, those skilled in the art will recognize numerous alternatives and equivalents that do not vary from the invention, and therefore the present invention is not to be limited by the foregoing description, but only by the appended claims.

We claim:

1. An X-ray system for providing alternating X-ray pulses of first and second energies with controlled dose per pulse comprising:
   a linear accelerator having resonance with a bandwidth,
   a mechanically-adjustable magnetron responsive to a first control signal for supplying as an output RF energy to the linear accelerator at alternating first and second power levels with corresponding first and second frequencies,
   an electron gun driver, operating independently of the magnetron by being responsive to a second control signal different from the first control signal, for supplying to the linear accelerator alternating pulses of first and second beam currents at times substantially corresponding to the alternating first and second RF power levels, and wherein the bandwidth of the linear accelerator resonance is sufficiently broad to allow coupling of the magnetron output to the linear accelerator at the first and second RF power levels such that the first and second energies of the X-ray pulses are at least 1 MeV apart and less than 5 MeV apart with controlled dose per pulse for pulses of both first and second energies.

2. The system of claim 1 wherein one of the first and second energies corresponds to high energy pulses and the second of the first and second energies corresponds to low energy pulses, and the dose delivered by the high energy pulses in comparison to the dose delivered by the low energy pulses is a controllable ratio.

3. The system of claim 2 where the ratio is substantially one.

4. The system of claim 2 wherein the ratio is substantially different from one.

5. An X-ray system for providing alternating X-ray pulses of first and second energies with controlled dose per pulse comprising:
   a linear accelerator having resonance with a bandwidth,
   a mechanically-adjustable magnetron responsive to a first control signal for supplying as an output RF pulses to the linear accelerator at alternating first and second power levels with corresponding first and second frequencies, the RF pulses creating an envelope of a corresponding power,
   an electron gun driver, responsive to a second control signal different from the first control signal, for supplying to the linear accelerator alternating pulses of first and second beam currents to occur within the envelopes created by the corresponding alternating first and second RF power levels, and wherein the bandwidth of the linear accelerator resonance is sufficiently broad to allow coupling of the magnetron output to the linear accelerator at the first and second RF power levels such that the first and second energies of the X-ray pulses are at least 1 MeV apart and less than 5 MeV apart with controlled dose per pulse for pulses of both first and second energies.

6. The X-ray system of claim 5 wherein the electron gun driver is a dual mode gun driver comprising a first module for high energy pulses and a second module for low energy pulses.

7. The X-ray system of claim 5 wherein the alternating pulses of first and second beam currents are adjustable in amplitude, duration and timing to cause the beam current pulses to be synchronized and matched with the RF pulses to cause X-ray pulses of different, controllable energy levels with consistent controllable dose per pulse.

8. The X-ray system of claim 7 wherein the RF pulses include a substantially flat portion and the timing of the beam current pulses is configured to cause the beam current pulse to occur early in the substantially flat portion of the RF pulse.

9. The X-ray system of claim 5 wherein the dose of each X-ray pulse is adjusted by altering the duration of an associated beam current pulse.

10. The X-ray system of claim 9 wherein the X-ray pulses of different energy levels supply the same dose per pulse.

11. The X-ray system of claim 9 wherein the X-ray pulses of different energy levels supply different dose per pulse.

12. An X-ray system for providing alternating X-ray pulses of first and second energies with controlled dose per pulse comprising:
   a control processor for providing first and second control signals, different from one another,
   a linear accelerator having a Q less than 5000 and having resonance with a bandwidth,
   a mechanically-adjustable magnetron responsive to the first control signal for supplying as an output RF pulses to the linear accelerator at alternating first and second power levels with corresponding first and second frequencies, the RF pulses creating an envelope of a corresponding power,
   an electron gun driver, responsive to the second control signal, for supplying to the linear accelerator alternating pulses of first and second beam currents that are adjustable in amplitude, timing and during so as to occur within the envelopes created by the corresponding alternating first and second RF power levels, and wherein the bandwidth of the linear accelerator resonance is sufficiently broad to allow coupling of the magnetron output to the linear accelerator at the first and second RF power levels such that the first and second energies of the X-ray pulses are at least 1 MeV apart and less than 5 MeV apart with controlled dose per pulse for pulses of both first and second energies.

13. The X-ray system of claim 12 further comprising a modulator and pulse transformer connected between the control processor and the magnetron for causing the magnetron to be responsive to the first control signal.

14. The X-ray system of claim 13 further comprising a mechanical tuner configured to output a signal to the magnetron for adjusting the frequency of the RF power pulses.

15. The X-ray system of claim 14 further comprising automated frequency control for adjusting the mechanical tuner in response to changes in operating parameters.

* * * * *